US012276150B2

(12) United States Patent
Ruedisser et al.

(10) Patent No.: US 12,276,150 B2
(45) Date of Patent: Apr. 15, 2025

(54) DEVICE FOR CONTROLLING AT LEAST ONE ELECTRICALLY DRIVABLE OR MOVABLE FURNITURE ELEMENT

(71) Applicant: Julius Blum GmbH, Hoechst (AT)

(72) Inventors: Thomas Ruedisser, Hohenems (AT); Florian Burtscher, Dornbirn (AT); Thomas Taimler, Hoechst (AT)

(73) Assignee: JULIUS BLUM GMBH, Hoechst (AT)

( * ) Notice: Subject to any disclaimer, the term of this patent is extended or adjusted under 35 U.S.C. 154(b) by 37 days.

(21) Appl. No.: 18/072,137

(22) Filed: Nov. 30, 2022

(65) Prior Publication Data

US 2023/0184027 A1 Jun. 15, 2023

Related U.S. Application Data

(63) Continuation of application No. PCT/AT2021/060195, filed on Jun. 2, 2021.

(30) Foreign Application Priority Data

Jun. 5, 2020 (AT) .............................. A 50493/2020

(51) Int. Cl.

| | |
|---|---|
| ***E05F 15/77*** | (2015.01) |
| ***A47B 88/457*** | (2017.01) |
| ***E05F 15/63*** | (2015.01) |

(52) U.S. Cl.

CPC ............ *E05F 15/77* (2015.01); *A47B 88/457* (2017.01); *E05F 15/63* (2015.01); *E05Y 2900/20* (2013.01); *E05Y 2900/308* (2013.01)

(58) Field of Classification Search

None

See application file for complete search history.

(56) References Cited

U.S. PATENT DOCUMENTS

| | | | | |
|---|---|---|---|---|
| 6,219,011 | B1 * | 4/2001 | Aloni | H04N 9/3147 345/1.3 |
| 6,498,685 | B1 * | 12/2002 | Johnson | G02B 3/0062 347/241 |
| 6,850,352 | B1 * | 2/2005 | Childers | G09G 3/34 382/162 |

(Continued)

FOREIGN PATENT DOCUMENTS

| | | |
|---|---|---|
| AT | 11 904 | 7/2011 |
| AT | 513756 | 7/2014 |

(Continued)

OTHER PUBLICATIONS

International Search Report issued Sep. 29, 2021 in International (PCT) Application No. PCT/AT2021/060195.

(Continued)

*Primary Examiner* — Fekadeselassie Girma

(74) *Attorney, Agent, or Firm* — Wenderoth, Lind & Ponack, L.L.P.

(57) ABSTRACT

A device for controlling a movable furniture element includes a main transmitter, an auxiliary transmitter, and a receiver. The auxiliary transmitter is separate from the main transmitter. The movable furniture element is controllable by a first wireless signal transmitted from the main transmitter to the receiver. The movable furniture element is also controllable by a second wireless signal transmitted from the auxiliary transmitter to the receiver.

21 Claims, 7 Drawing Sheets

(56) References Cited

U.S. PATENT DOCUMENTS

| | | | | |
|---|---|---|---|---|
| 7,068,208 | B2 | 6/2006 | Wu | |
| 9,478,122 | B2 | 10/2016 | Hille | |
| 10,123,631 | B2 | 11/2018 | Sizer et al. | |
| 10,590,692 | B2 | 3/2020 | Bohle | |
| 2004/0193420 | A1* | 9/2004 | Kennewick | G06F 16/3329 704/270.1 |
| 2004/0252045 | A1 | 12/2004 | Wu | |
| 2010/0066220 | A1 | 3/2010 | Grimm | |
| 2011/0245979 | A1 | 10/2011 | Koch | |
| 2014/0253713 | A1* | 9/2014 | Zhai | G01N 21/17 348/80 |
| 2015/0130595 | A1 | 5/2015 | Hille | |
| 2016/0242542 | A1 | 8/2016 | Friesenecker et al. | |
| 2017/0143565 | A1* | 5/2017 | Childs | A61G 7/015 |
| 2017/0249445 | A1* | 8/2017 | Devries | A61B 5/145 |
| 2017/0295949 | A1 | 10/2017 | Sizer et al. | |
| 2018/0199716 | A1* | 7/2018 | Bertinato | A47C 7/72 |
| 2018/0289175 | A1 | 10/2018 | Lukas | |
| 2019/0010747 | A1 | 1/2019 | Bohle | |
| 2020/0297619 | A1* | 9/2020 | Ambrogio | C11D 3/381 |
| 2021/0035580 | A1* | 2/2021 | Hille | G10L 15/32 |

FOREIGN PATENT DOCUMENTS

| | | | | |
|---|---|---|---|---|
| AT | 514945 | | 5/2015 | |
| CN | 204002267 | | 12/2014 | |
| CN | 205334130 | U * | 6/2016 | |
| CN | 206711307 | U * | 12/2017 | |
| CN | 104137518 | B * | 8/2018 | H04L 61/2046 |
| DE | 10133227 | A1 * | 3/2002 | B60W 10/04 |
| DE | 10 2017 107 109 | | 10/2018 | |
| JP | 2007-301344 | | 11/2007 | |
| JP | 2008-129614 | | 6/2008 | |
| WO | 2010/040749 | | 4/2010 | |
| WO | 2013/186356 | | 12/2013 | |
| WO | 2017/177247 | | 10/2017 | |
| WO | 2019/197424 | | 10/2019 | |

OTHER PUBLICATIONS

Definition of Bluetooth, Wikipedia, entry last edited Nov. 2, 2022 (obtained Nov. 29, 2022), URL: https://en.wikipedia.org/wiki/Bluetooth.

"Enhanced ShockBurst (ESB) Proprietary Radio Protocol", Enhanced ShockBurst ESB Protocol on nRF52 Series, Apr. 4, 2020, URL: https://jimmywongiot.com/2020/04/04/enhanced-shockburst-esb-protocol-on-nrf52-series/.

* cited by examiner

DEVICE FOR CONTROLLING AT LEAST ONE ELECTRICALLY DRIVABLE OR MOVABLE FURNITURE ELEMENT

BACKGROUND OF THE INVENTION

1. Field of the Invention

The invention relates to a device for controlling at least one electrically drivable or movable furniture element and a furniture arrangement with such a device. The invention also relates to a method for controlling at least one electrically drivable or movable furniture element and a corresponding computer program product.

The use of electrically drivable or movable furniture elements replaces the manual opening and closing of furniture parts, in particular flaps, doors or drawers. This makes a convenient and effort-saving operation of furniture parts possible.

2. Description of the Related Art

According to the state of the art, the controlling of electrically drivable or movable furniture elements is often effected via a wireless connection. This dispenses with the costly laying of wires.

Published document AT 11 904 U1 discloses a physically actuatable switch, which sends wireless signals via an auxiliary transmitter to a receiver of the furniture element and thus prompts it to move a furniture part.

Although the switch can be positioned so as to be easier to actuate and at a location that is easier to reach than the furniture part itself, an operator must be at the location of the switch to move the furniture part.

Moreover, the switch must be physically actuated directly by the operator themselves, either directly by hand or indirectly by pressing on the furniture part in front of it.

SUMMARY OF THE INVENTION

The object of the present invention is to avoid these disadvantages. In particular, an improved device for controlling at least one electrically drivable or movable furniture element, an improved furniture arrangement with such a device, an improved method for controlling an electrically drivable or movable furniture element and an improved computer program product for performing such a method are to be created.

A device according to the invention for controlling at least one electrically drivable or movable furniture element has

- at least one auxiliary transmitter for emitting at least one wirelessly transmitted signal and
- at least one receiver for receiving at least one wirelessly transmitted signal, wherein the at least one furniture element can be controlled by means of at least one wirelessly transmitted first signal, wherein the at least one wirelessly transmitted first signal can be transmitted from the at least one auxiliary transmitter to the at least one receiver.

It is provided that at least one main transmitter which is separate from the at least one auxiliary transmitter is provided, from which at least one main transmitter at least one wirelessly transmitted second signal can be sent to the at least one receiver, and the at least one furniture element can be controlled by means of at least one second signal transmitted from the at least one main transmitter to the at least one receiver.

With main transmitter and auxiliary transmitter, in particular two separate, preferably spatially separate, transmitters are provided. Since a main transmitter can also access the at least one furniture element besides the auxiliary transmitter, a second object can also control the at least one furniture element besides a switch.

The diversity of control options is thus increased. For example, besides an auxiliary transmitter comprising a manual switch, a contactless control can also be achieved via a voice-controlled main transmitter.

However, other formations of the two transmitters (main transmitter and auxiliary transmitter) are also possible, for example an auxiliary transmitter fixedly connected to the piece of furniture and a main transmitter formed on a mobile terminal device.

Furthermore, it is possible fora transmitter which communicates with another furniture element to be formed in a furniture element itself.

In order to meet modern standards it is provided that the at least one first signal and/or the at least one second signal is a digital signal, which can preferably be transmitted via at least one digital transmission protocol.

In an embodiment example of the device according to the invention it is provided that the at least one first signal and/or the at least one second signal is a control signal for controlling at least one furniture element. A piece of furniture can thus be accessed on the basis of the control signal.

In addition, each furniture element can be allocated its own receiver. The furniture elements can thus receive signals independently.

It is also provided that the at least one auxiliary transmitter is in cabled and/or wireless data connection with a furniture element, wherein at least one wirelessly transmitted second signal can be sent to the receiver of at least one further furniture element, and the further furniture element can be controlled by means of this at least one second signal. Thus, information about the movement status of a furniture element can be transmitted to another furniture element.

In an embodiment example it is provided that at least one auxiliary transmitter is arranged on at least one domestic appliance, preferably a robotic vacuum cleaner or a microwave oven.

The domestic appliance can communicate with at least one furniture element via the auxiliary transmitter and, for example, open a flap by itself.

In addition, each furniture element can be allocated its own auxiliary transmitter. For example, each furniture element can be controlled with an auxiliary transmitter via its own switch.

In order to also make a centralized control possible, a common main transmitter is provided for at least two, preferably for all furniture elements.

Moreover, it can be provided that, for at least one furniture element, preferably for all furniture elements, the at least one auxiliary transmitter lies closer to the furniture element than the at least one main transmitter. That is the case, for example, when the at least one auxiliary transmitter is allocated in each case to a switch and the main transmitter is formed as a centralized transmitter.

In an embodiment example of the device it is provided that the at least one furniture element has an electrical drive device for moving a movable furniture part, in particular a drawer, a door or a flap. The furniture element is thus formed as a furniture drive and can open or close a furniture part.

Moreover, it can be provided that the at least one furniture element has at least one electrical closing device for locking a movable furniture element, in particular a drawer, a door or a flap.

The furniture element is thus formed as a furniture lock and can lock a furniture part. Unauthorized persons can thereby be barred from accessing certain compartments.

In an embodiment example of the device it is provided that the at least one furniture element and the allocated receiver are combined to form a structural unit, preferably accommodated in a common housing. The combination in a structural unit reduces the effort during installation in the piece of furniture, for example. The accommodation in a housing also makes an unobtrusive and/or aesthetic appearance of the structural unit possible.

In an embodiment example it is provided that the at least one furniture element that is in radio communication with a particular auxiliary transmitter and the particular auxiliary transmitter are attached to or mounted in the same piece of furniture. That is the case, for example, when the auxiliary transmitter is structurally combined with a switch, which switch is arranged on the piece of furniture. In particular, the switch can be actuatable directly or indirectly via the furniture part.

In an embodiment example it is provided that the at least one main transmitter is integrated in a preferably wireless network, in particular a WLAN network.

This main transmitter can therefore function as an interface ("bridge") between the wireless network and the furniture drives. The wireless network can also be in data connection with the internet via a router.

In order to have a further, contactless control option available in addition to or in place of the control option through a physical intervention of the operator (for example via a push button), it is beneficial if a device for voice control is provided, which accesses at least one furniture element via the at least one main transmitter.

In such an embodiment example with voice control it can in particular be provided that the device for voice control comprises a terminal device, connected to the internet, with a microphone, wherein

- a voice recording effected by the terminal device can be sent to an external computer network, in particular over the internet,
- an electronic message determined by the voice recording and/or an operating command determined by the voice message can be sent from the external computer network to the at least one main transmitter, in particular over a wireless network, and
- at least one signal determined by the operating command can be transmitted to at least one furniture element.

The external computer network is usually referred to as the cloud. It is provided that existing cloud services are used, such as for example from Google or Amazon.

In a further embodiment example of the device according to the invention it is provided that the at least one main transmitter can be accessed from a mobile terminal device, preferably via a Bluetooth connection, wherein in normal operation at least one furniture element can be accessed in turn by the at least one main transmitter. That makes the communication with the furniture elements by a mobile terminal device via the main transmitter as a central interface ("bridge") possible.

In an embodiment example of the device according to the invention it is provided that, for the at least one auxiliary transmitter, a switch that is physically operatable, in particular by hand, is provided, through the actuation of which the auxiliary transmitter can be prompted to send at least one second signal to at least one receiver. An operator can thus control the furniture element via manual actuation of a switch.

In an embodiment example of the device according to the invention it is provided that the auxiliary transmitter and the switch are assembled to form a structural unit, preferably in a common housing. The combination in a structural unit reduces the effort during installation in the piece of furniture, for example. The accommodation in a housing also makes an unobtrusive and/or aesthetic appearance of the structural unit possible.

In a preferred embodiment example of the device the transmission is effected, with a first transmission protocol of the at least one signal,

- unidirectionally between the at least one main transmitter and the at least one receiver and/or
- addressed directly to the at least one receiver and/or
- without an acknowledgement of receipt by the at least one receiver and/or
- without checking the readiness-to-receive of the at least one receiver and/or
- with a firmly predefined or predefinable routing of the at least one signal, wherein ESB (Enhanced ShockBurst) is preferably used as first transmission protocol. Among other things through the above-named properties, ESB makes the transmission of data with a short latency time possible. A short latency time is vital for a fluid operability by an operator.

Moreover, it is provided that a second transmission protocol is Bluetooth. The advantage of Bluetooth consists in the standard support of typical devices. A large number of devices can thus be used, for example, for controlling the at least one furniture element.

The combined use of two transmission protocols (ESB and Bluetooth) makes possible the advantage of short latency times for transmitters provided at the factory, through the use of ESB, and at the same time high flexibility in the use of additional devices of any desired make, such as for example domestic appliances or mobile terminal devices, through the use of Bluetooth.

A furniture arrangement according to the invention comprises at least one piece of furniture and at least one device according to the invention for controlling an electrically drivable or movable furniture element.

In an embodiment example of the furniture arrangement according to the invention it is provided that the furniture arrangement comprises at least two pieces of furniture.

Furthermore, it is provided that the furniture arrangement comprises, as driven furniture parts, at least one flap and/or at least one door and/or at least one drawer, wherein in the case where the furniture arrangement comprises several pieces of furniture, the furniture parts can be distributed between the several pieces of furniture as desired.

In the case of such a furniture arrangement, a kitchen is preferably envisaged. The device for receiving signals can then make communication with the kitchen possible in many different ways. For example, the kitchen can be controlled via voice control, switch and mobile terminal device and can communicate with domestic appliances.

In the method according to the invention for controlling at least one electrically drivable or movable furniture element, in particular with the above-named device according to the invention,

- at least one auxiliary transmitter for emitting at least one wirelessly transmitted signal and at least one receiver for receiving at least one wirelessly transmitted signal is used.

It has the following method steps:

transmitting at least one first signal and at least one second signal to the at least one receiver controlling the at least one furniture element on the basis of the at least one first signal and on the basis of the at least one second signal.

It is provided that the at least one first signal originates from the at least one auxiliary transmitter and the at least one second signal originates from at least one main transmitter, which is different from the at least one auxiliary transmitter.

In an embodiment example of the method according to the invention it is provided that, in the transmission method step, the transmission is effected unidirectionally between the main transmitter and/or auxiliary transmitter and the receiver and/or addressed directly to the receiver and/or without an acknowledgement of receipt by the receiver and/or without checking the readiness-to-receive of the receiver and/or with a firmly predefined or predefinable routing of the at least one signal, wherein ESB (Enhanced ShockBurst) is preferably used as transmission protocol. An advantage of this transmission protocol consists in particular in a data transmission with a short latency time.

The computer program product according to the invention comprises commands, which, if executed by at least one arithmetic unit, prompt it to perform the method according to the invention from at least one memory unit, which is in a data connection with the at least one arithmetic unit or can be brought into such a connection.

With respect to the present application, by the expression "signal" is meant a physical signal. For example, within this meaning, two signals which transmit the same semantic content via the same transmission protocol but are sent one after the other are different from one another.

BRIEF DESCRIPTION OF THE DRAWINGS

Embodiment examples of the invention are discussed with reference to the figures. There are shown in.

DETAILED DESCRIPTION OF THE INVENTION

FIG. 1*a*, FIG. 1*b*, FIG. 2, FIG. 3, FIG. 4*a* and FIG. 4*b* show various embodiments of pieces of furniture 9 with furniture drives 11, which are severally already the state of the art. Of course, the invention can also be used with novel, other furniture drives 11.

Figure 1A:
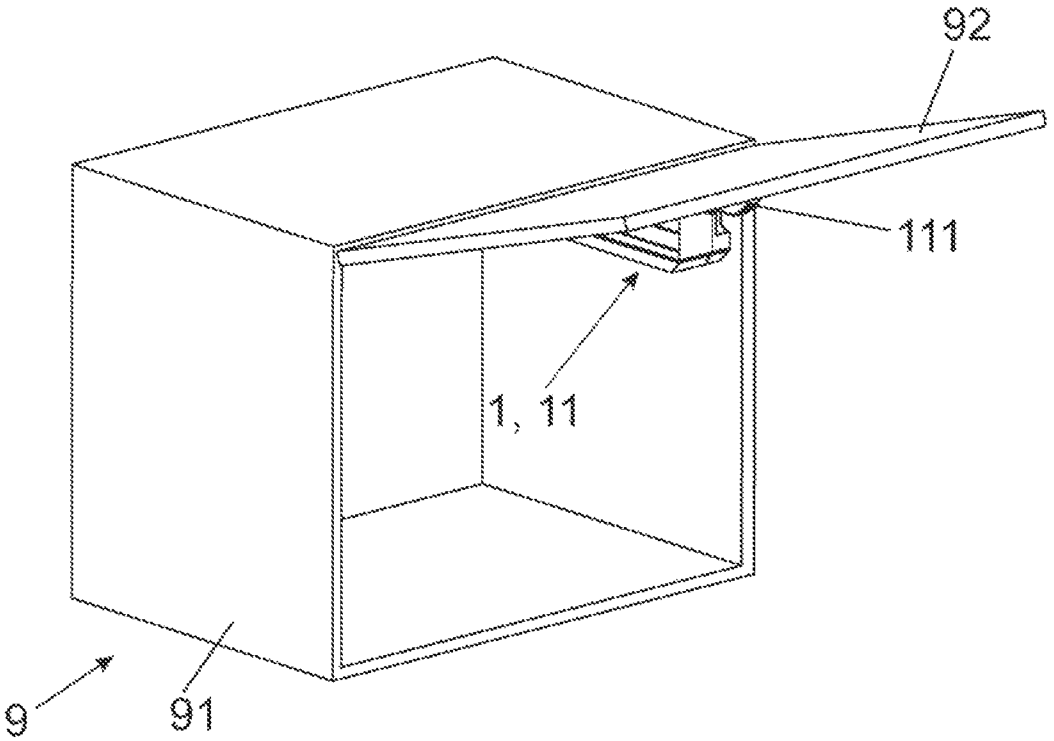
FIGS. 1*a, b* piece of furniture with a furniture drive for moving a flap.
Figure 1B:
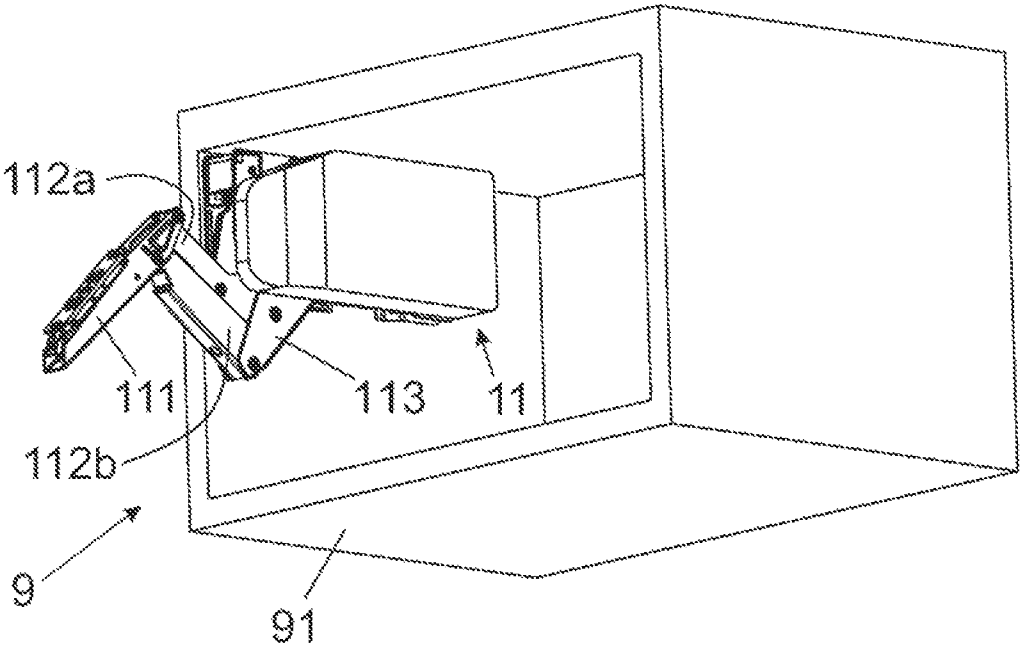

In FIGS. 1*a* and 1*b*, in each case a piece of furniture 9 with a furniture element 1 formed as a furniture drive 11 is shown. A flap 92 that can be opened upwards is also shown in FIG. 1*a* but is not represented in FIG. 1*b* for reasons of clarity. The flap 92 is connected to the furniture carcass 91 via the furniture element 1 formed as a furniture drive 11. The furniture element 1 comprises a control arm 111, two levers 112*a*, 112*b* and a drive lever 113. The control arm 111 is fastened to the flap 92 and rotatably connected to the levers 112*a*, 112*b*. A drive lever 113, which can be moved electrically by the furniture drive 11, is in turn rotatably connected to the levers 112*a*, 112*b*. This embodiment of the furniture drive 11 is also disclosed in published document WO 2017/177247 A1.

Figure 2:
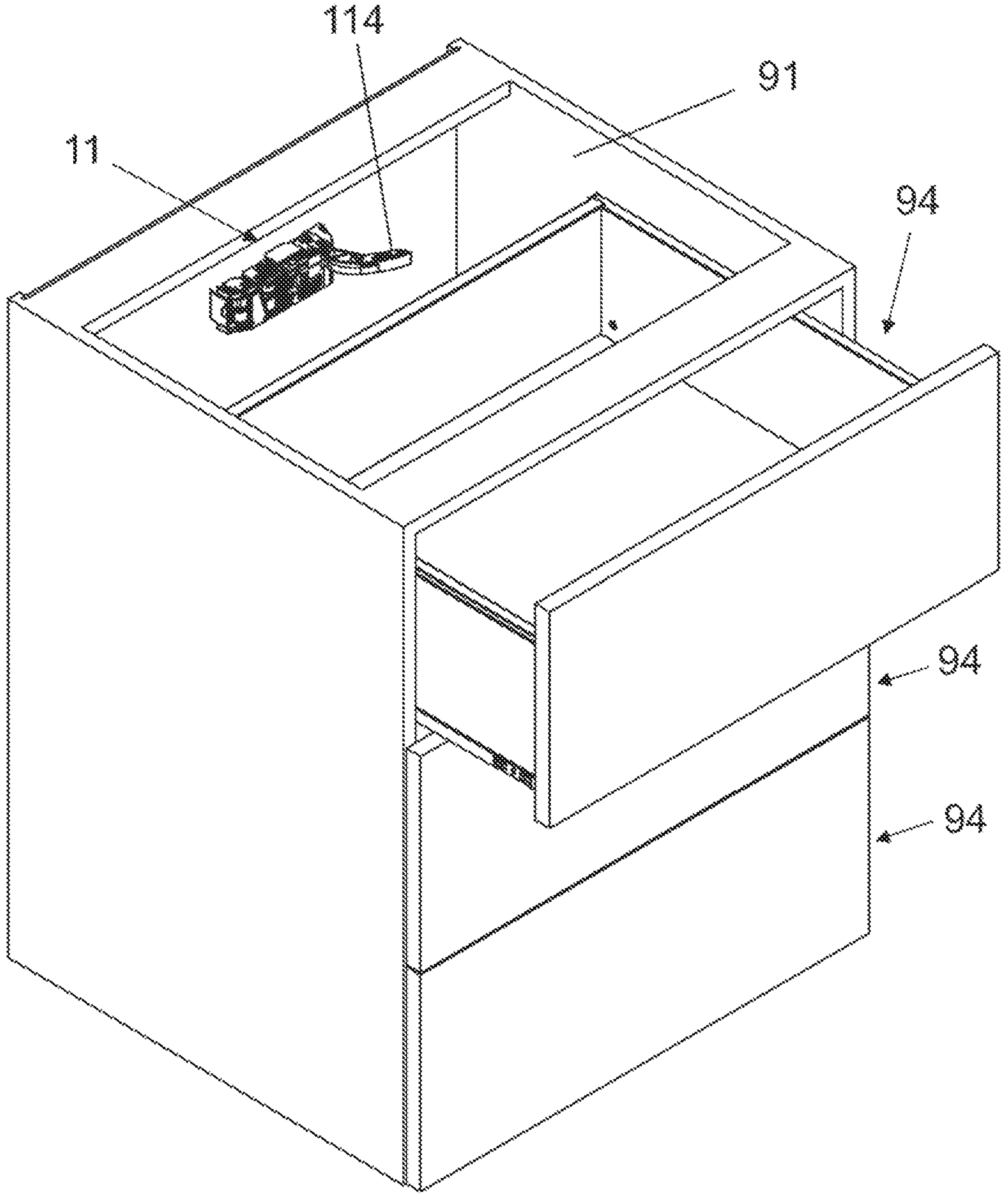
FIG. 2 piece of furniture with a furniture drive for ejecting a drawer.

FIG. 2 shows a piece of furniture 9, which has three drawers 94 in a furniture carcass 91. At least one drawer 94 can be ejected electrically by a furniture drive 11. For this, the furniture drive 11 has an ejection lever 114. This embodiment is also disclosed in published document AT 513756 A4.

Figure 3:
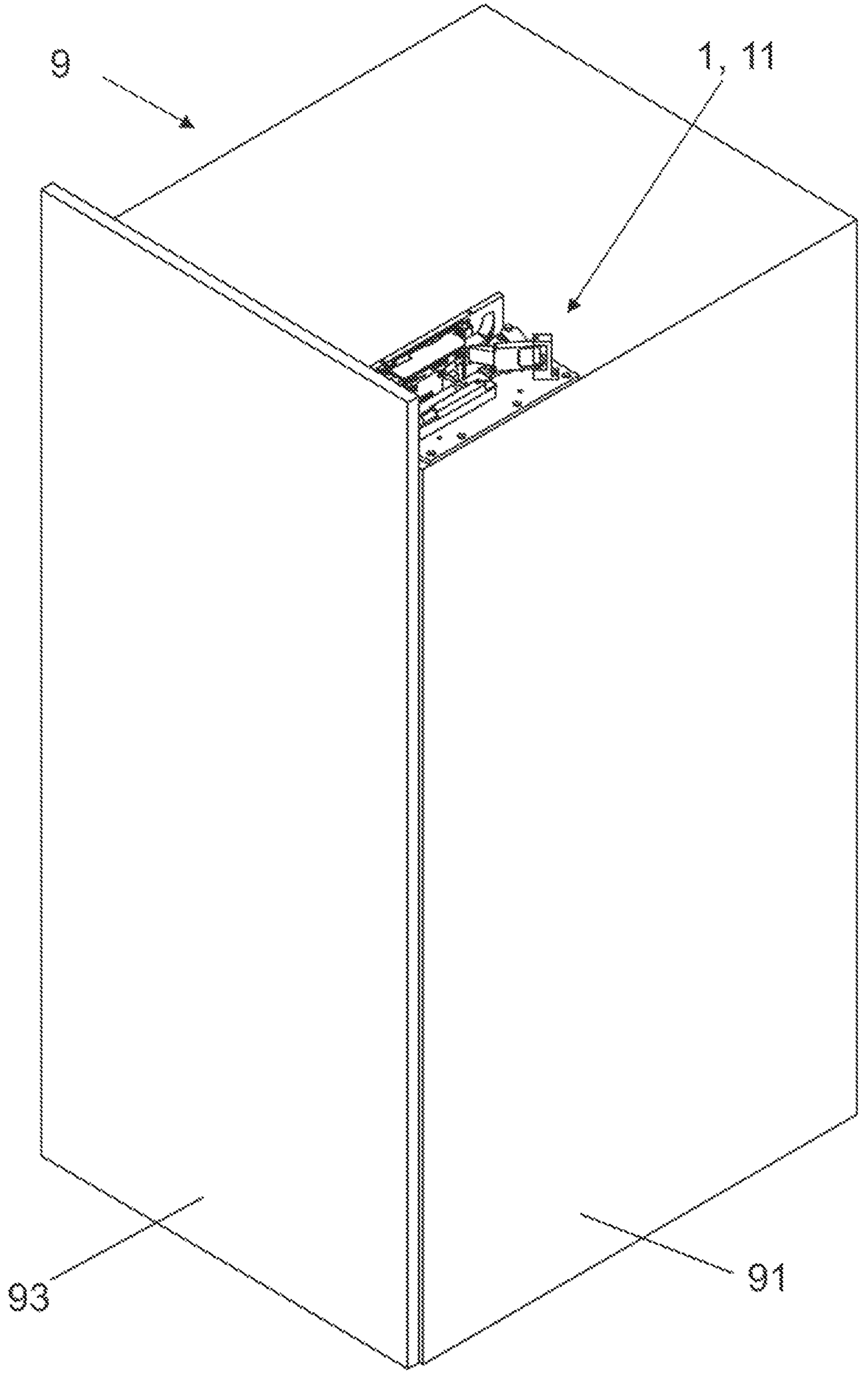
FIG. 3 piece of furniture with a furniture drive for ejecting a door.

FIG. 3 shows a piece of furniture 9 in the form of a cabinet. The door 93 arranged on the furniture carcass 91 can be ejected by an electrical furniture drive 11 as in FIG. 2. This embodiment is also disclosed in published document AT 514945 A4.

The electrical furniture drives 11 shown in FIGS. 1*a* to 3 can also be accessed via a radio communication.

Figure 4A:
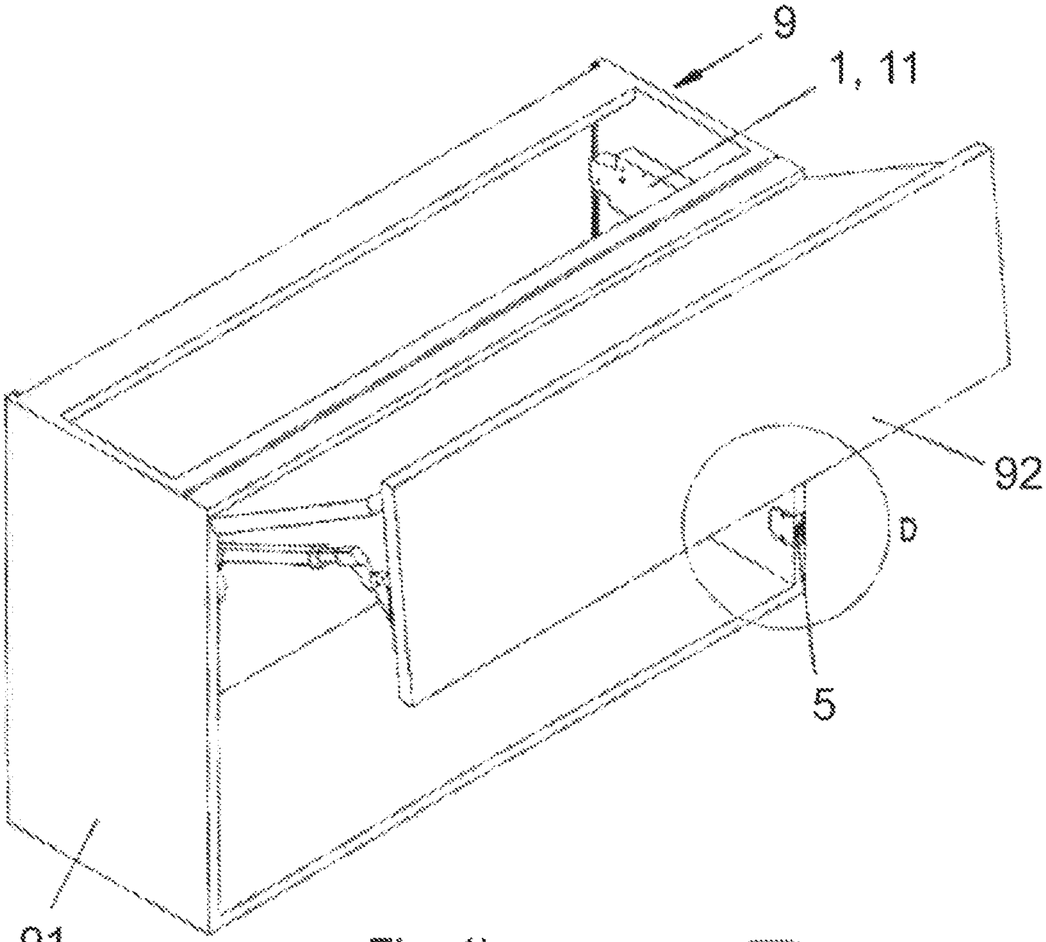
FIGS. 4*a, b* piece of furniture with a furniture drive for moving a flap and physically actuatable switch, FIG. 5 schematic overview of several furniture elements controlled via radio signals, and FIGS. 6*a-e* embodiment examples of the device according to the invention for controlling at least one furniture element.
Figure 4B:
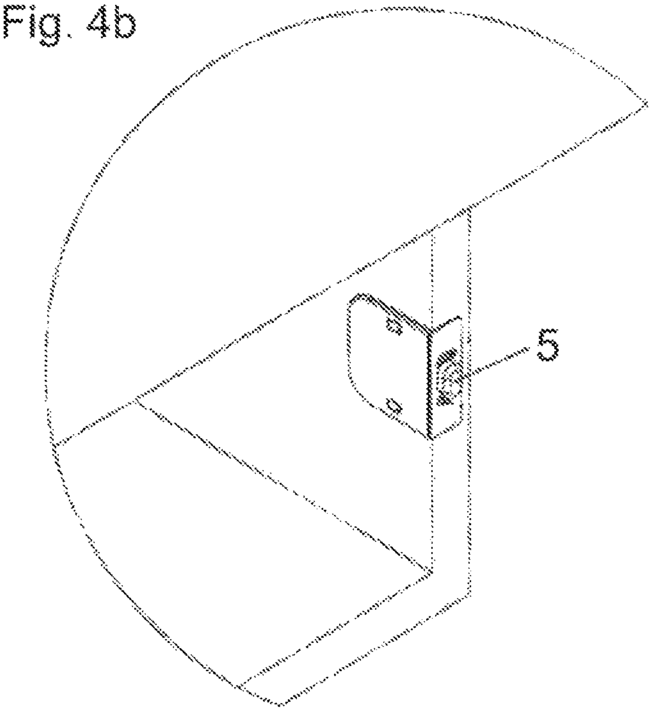

FIGS. 4*a* and 4*b* disclose an embodiment example of a physically actuatable switch 5, which transmits signals 4 to the furniture drive 11 via a radio communication. The signals 4 can prompt the furniture drive 11 to open or close the flap 92. Here, FIG. 4*b* shows a detailed view of the region D in FIG. 4*a*. This embodiment example is also disclosed in published document AT 11 904 U1.

In an embodiment example of the present application it is provided that several pieces of furniture 9 form a furniture arrangement.

The furniture arrangement can, for example, comprise a kitchen unit with several pieces of kitchen furniture. Through the communication with and between several furniture elements 1, in particular furniture drives 11 and furniture locks 12, the kitchen can be made easier to use.

In particular, flaps 92, doors 93 and drawers 94 can electively be controlled by radio switch 5, voice control, mobile terminal device 34 or the like.

Figure 5:
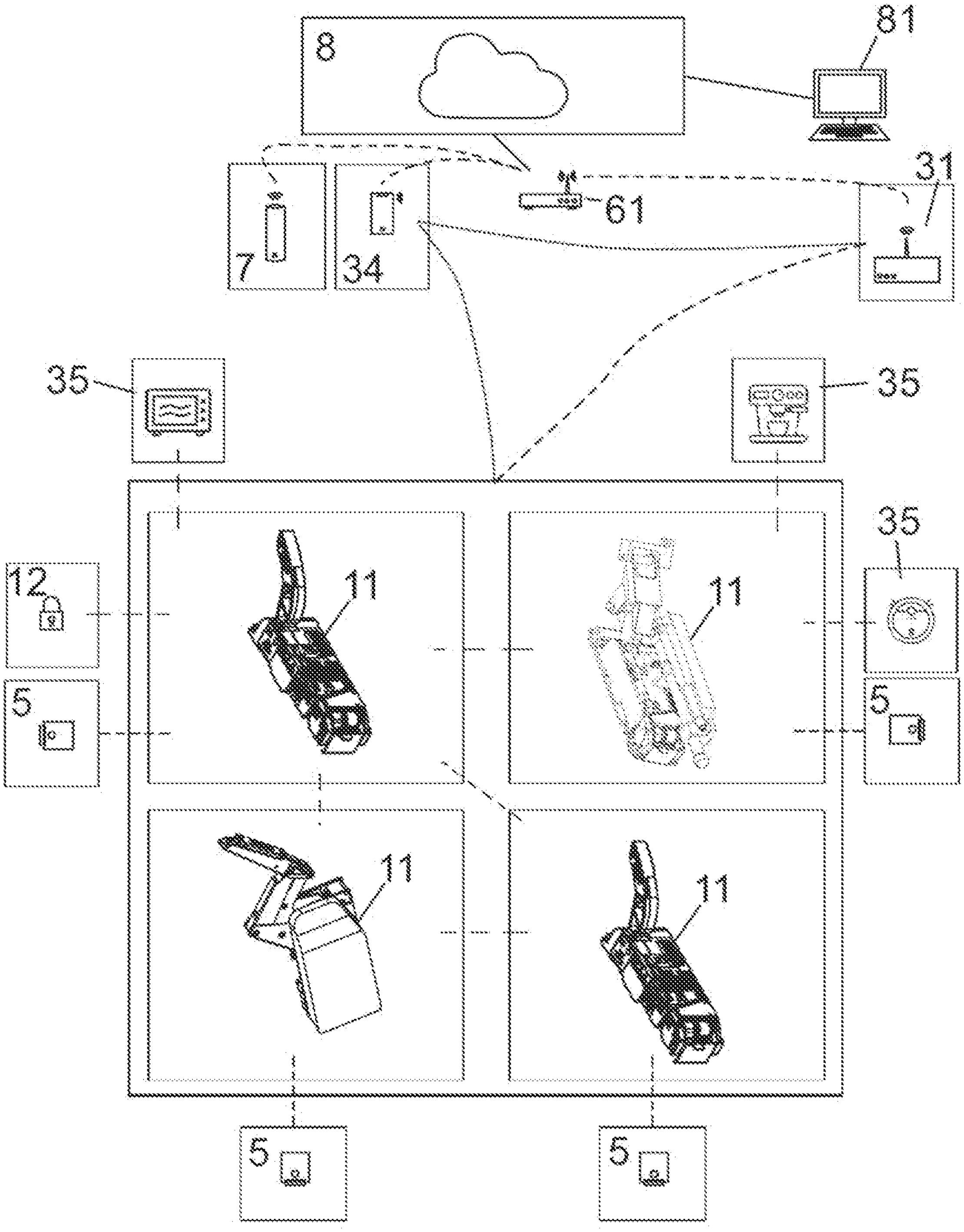

FIG. 5 shows a schematic representation of the communication with and between several furniture elements 1 by means of a wireless communication network. The dashed lines show radio communications between the individual elements. The following are part of the wireless communication network:

four furniture drives 11 of different types, in particular of the type in FIG. 1, FIG. 2 and FIG. 3 physically actuatable switches 5 a furniture lock 12 domestic appliances 35 in the form of a microwave oven, a coffee machine and a robotic vacuum cleaner a main transmitter 31, which is integrated into a wireless network 6 a router 61, which is likewise integrated into a wireless network 6 and can produce a connection to the internet a mobile terminal device 34 and a device for voice control 7.

Over the internet, the communication network is in data connection with at least one external computer network 8 ("cloud"), in which the analysis of a voice message can be carried out, for example. At least one external computer network 8 can be accessed by means of a computer with web interface 81.

FIGS. 6*a-e* show various embodiment examples of the device according to the invention for controlling the furniture element 1, wherein in each case at least one signal 4 is wirelessly transmitted from at least one main transmitter 31 and at least one auxiliary transmitter 32 to at least one receiver 2. The signal 4 is transmitted to at least one furniture element 1 and used to control the at least one furniture element 1.

Figure 6A:
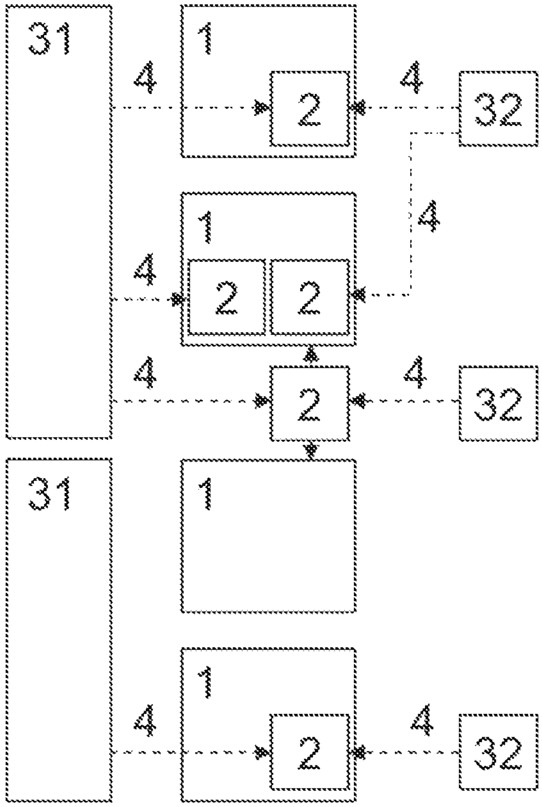

FIG. 6*a* shows an embodiment example with two main transmitters 31, which wirelessly transmit a signal 4 to four receivers 2. The receivers 2 are partially allocated to a specific furniture element 1. However, an auxiliary transmitter 32 can also not be firmly allocated to a single furniture element 1, but instead also transmit the received signals 4 to two furniture elements 1, for example. In addition, three auxiliary transmitters 32 likewise send a signal 4 to the receivers 2.

Figure 6B:
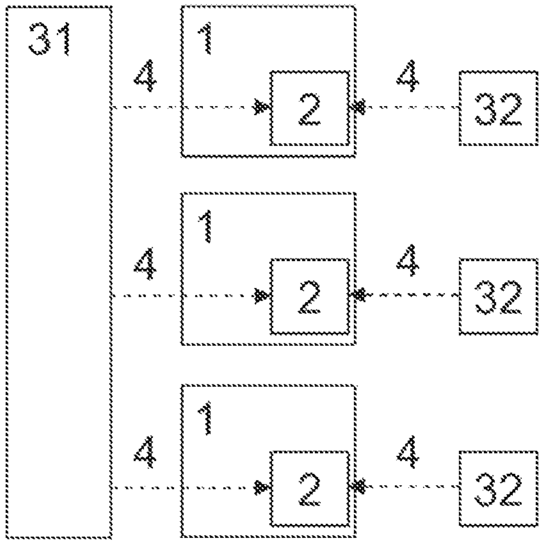

FIG. 6*b* shows a typical embodiment example with only one main transmitter 31. This one main transmitter 31 wirelessly transmits signals 4 to each receiver 2. Each receiver 2 is allocated to one furniture element 1, wherein the received signals 4 can be used to control the respective furniture element 1. Each receiver 2 can also receive signals 4 from an auxiliary transmitter 32, wherein here one auxiliary transmitter 32 is allocated to each receiver 2.

Figure 6C:
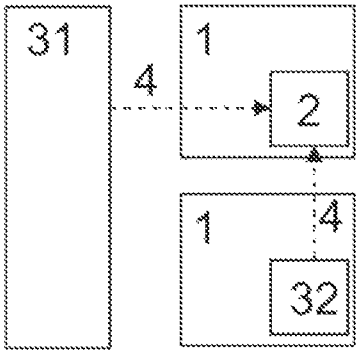

FIG. 6*c* shows a further embodiment example, in which a first furniture element 1 is controlled through signals 4 of a main transmitter 31 and through signals 4 of an auxiliary transmitter 32, wherein the auxiliary transmitter 32 is arranged in a second furniture element 1.

This configuration can, for example, be used to avoid collisions between two furniture parts 90, for example flaps 92, doors 93 or drawers 94, driven by the two furniture elements 1. If, for example, the main transmitter 31 gives the first furniture element 1, by means of the receiver 2, the command to move a furniture part 90, this command can be countered, depending on the position of the second furniture element 1 with a second driven furniture part 90, by means of a signal 4 sent by the auxiliary transmitter 32.

This configuration can also be used when the second furniture element 1 is a furniture lock 12 and the first furniture element 1 is a furniture drive 11 of the same furniture part 90. In this case, in the case of a locked furniture lock 12, the auxiliary transmitter 32 on the furniture lock 12 can counteract an opening of the furniture part 90 commanded by the main transmitter 31, in order for example to avoid damage to the piece of furniture 9.

Figure 6D:
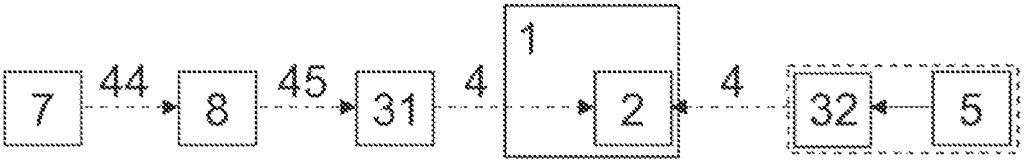

FIG. 6*d* shows the control of a furniture element 1 via a voice input by means of a device for voice control 7 and via a physically, in particular manually, actuatable switch 5.

For the voice control, a voice recording 44 is made by the microphone of the device for voice control 7 and passed to at least one external computer network 8 over the internet. There, the voice recording 44 is analyzed and an electronic message 46 and/or an operating command 45 is generated. An electronic message 46 can also be generated in an external computer network 8 and an operating command 45 can be generated in a further external computer network 8 from the electronic message 46.

The electronic message 46 and/or the operating command 45 are then sent back to the operator. The main transmitter 31 receives the operating command 45 and/or the electronic message 46 over a wireless network 6 of the operator and controls the furniture element 1 with signals 4 via the receiver 2. The voice recording can, for example, include "open", wherein the main transmitter 31 is then prompted to open the furniture part 90 driven by the furniture element 1.

In parallel with this, the auxiliary transmitter 32 is prompted, through the manual actuation of the switch 5, to send a signal 4 to the receiver 2. The auxiliary transmitter 32 can be structurally combined with the switch 5. The furniture part 90 can thus be opened and locked by means of voice control and manual control.

Figure 6E:
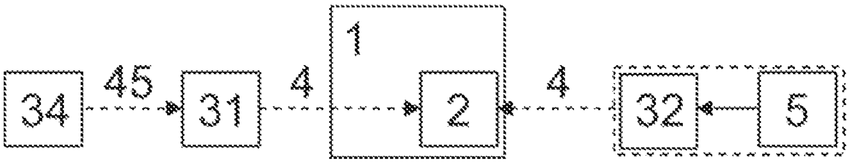

FIG. 6*e* shows the control of a furniture element 1 by a switch 5 via the auxiliary transmitter 32 and by a mobile terminal device 34 via the main transmitter 31. The mobile terminal device 34 sends operating commands 45 to the main transmitter 31. For this, a program ("app") for operating the furniture elements 1 can be installed on the mobile terminal device 34.

In addition, a program ("app") for configuring the furniture elements 1 can be present, by means of which both the main transmitter 31 and the auxiliary transmitter 32 can be configured with the associated furniture element 1. Both the movement of a single furniture element 1 and the common, synchronized movement of two or more furniture elements 1 can be preconfigured. In addition, the movement of a furniture element 1 can be prohibited on the basis of the position and/or movement of another furniture element 1, in order to avoid collisions of the furniture parts 90 driven by the furniture elements 1.

LIST OF REFERENCE NUMBERS

1 furniture element
  11 furniture drive
    111 control arm
    112*a* lever
    112*b* lever
    113 lever
    114 ejection lever
  12 furniture lock
2 receiver
  21 first receiving unit
  22 second receiving unit
3 transmitter
  31 main transmitter
  32 auxiliary transmitter
  33 transmitter of a furniture element
  34 mobile terminal device
  35 domestic appliance
4 signal
  401 signal in the first transmission protocol
  402 signal in the second transmission protocol
  s41 control signal
  42 signal with configuration data
  43 signal with status data
  44 voice recording
  45 operating command
  46 electronic message
5 switch
6 wireless network
  61 router
7 device for voice control
8 external computer network
  81 computer with web interface
9 piece of furniture
  90 furniture part
  91 furniture carcass
  92 flap
  93 door
  94 drawer

The invention claimed is:

1. A device for controlling a first movable furniture element and a second movable furniture element, the device comprising:

a main transmitter;

an auxiliary transmitter;

a first receiver allocated to the first movable furniture element; and a second receiver allocated to the second movable furniture element, wherein:

the auxiliary transmitter is separate from the main transmitter;

the first movable furniture element is controllable by a first wireless signal transmitted from the main transmitter to the first receiver;

the first movable furniture element is controllable by a second wireless signal transmitted from the auxiliary transmitter to the first receiver;

the second movable furniture element is controllable by a third wireless signal transmitted from the main transmitter to the second receiver;

the second movable furniture element is controllable by a fourth wireless signal transmitted from the auxiliary transmitter to the second receiver; and (i) the first receiver is configured to receive the first wireless signal and the second wireless signal simultaneously; or (ii) the second receiver is configured to receive the third wireless signal and the fourth wireless signal simultaneously.

2. The device of claim 1, wherein the first wireless signal, the second wireless signal, the third wireless signal or the fourth wireless signal is a digital signal.

3. The device of claim 1, wherein the auxiliary transmitter is on a domestic appliance.

4. The device of claim 1, wherein the auxiliary transmitter is closer to the first movable furniture element or the second movable furniture element than the main transmitter.

5. The device of claim 1, wherein the first movable furniture element or the second movable furniture element has an electrical drive device.

6. The device of claim 1, wherein the first movable furniture element or the second movable furniture element has an electrical closing device.

7. The device of claim 1, wherein:

the first movable furniture element and the first receiver are in a common first housing; or the second movable furniture element and the second receiver are in a common second housing.

8. The device of claim 1, wherein the main transmitter is integrated in a wireless network.

9. The device of claim 1, further comprising a voice control device for the first movable furniture element or the second movable furniture element.

10. The device of claim 9, wherein the voice control device comprises a terminal device with a microphone and the terminal device is connectable to the internet.

11. The device of claim 1, wherein the main transmitter is accessible from a mobile terminal device.

12. The device of claim 1, further comprising a switch for the auxiliary transmitter.

13. The device of claim 12, wherein the auxiliary transmitter and the switch are in a common housing.

14. A method of controlling a first movable furniture element or a second movable furniture element with the device of claim 1, the method comprising:

transmitting the second wireless signal or the fourth wireless signal from the auxiliary transmitter;

receiving the second wireless signal with the first receiver or receiving the fourth wireless signal with the second receiver;

transmitting the first wireless signal or the third wireless signal from the main transmitter; and controlling the first movable furniture element based on the third wireless signal or controlling the second movable furniture element based on the fourth wireless signal.

15. The method of claim 14, wherein:

the first wireless signal is transmitted unidirectionally from the main transmitter to the first receiver or the third wireless signal is transmitted unidirectionally from the main transmitter the second receiver;

the second wireless signal is transmitted unidirectionally from the auxiliary transmitter to the first receiver or the fourth wireless signal is transmitted unidirectionally from the auxiliary transmitter the second receiver;

the first wireless signal or the second wireless signal is addressed directly to the first receiver; or the third wireless signal or the fourth wireless signal is addressed directly to the second receiver.

16. A non-transitory computer-readable medium having a program stored thereon for causing a computer to perform the method of claim 14.

17. A furniture arrangement comprising:

a piece of furniture; and the device of claim 1.

18. The furniture arrangement of claim 17, wherein the piece of furniture is one of a plurality of pieces of furniture.

19. The furniture arrangement of claim 17, wherein the first movable furniture element or the second movable furniture element is a flap, a door or a drawer.

20. The furniture arrangement of claim 17, wherein:

(i) the first movable furniture element is in radio communication with the auxiliary transmitter, and the first movable furniture element and the auxiliary transmitter are attached to or mounted in the same piece of furniture; or (ii) the second movable furniture element is in radio communication with the auxiliary transmitter, and the second movable furniture element and the auxiliary transmitter are attached to or mounted in the same piece of furniture.

21. A device for controlling a movable furniture element, the device comprising:

a main transmitter;

an auxiliary transmitter; and a receiver, wherein:

the auxiliary transmitter is separate from the main transmitter;

the movable furniture element is controllable by a first wireless signal transmitted from the main transmitter to the receiver;

the movable furniture element is controllable by a second wireless signal transmitted from the auxiliary transmitter to the receiver;

the movable furniture element and the receiver are in a common housing; and the receiver is configured to receive the first wireless signal and the second wireless signal simultaneously.

* * * * *